(12) United States Patent
Hengstler

(10) Patent No.: US 10,473,509 B2
(45) Date of Patent: *Nov. 12, 2019

(54) RADAR LEVEL GAUGE COMPRISING A SAFETY DEVICE

(71) Applicant: VEGA GRIESHABER KG, Wolfach (DE)

(72) Inventor: Clemens Hengstler, Haslach (DE)

(73) Assignee: VEGA GRIESHABER KG, Wolfach (DE)

(*) Notice: Subject to any disclaimer, the term of this patent is extended or adjusted under 35 U.S.C. 154(b) by 306 days.

This patent is subject to a terminal disclaimer.

(21) Appl. No.: 15/302,058

(22) PCT Filed: Jul. 7, 2014

(86) PCT No.: PCT/EP2014/064491
§ 371 (c)(1),
(2) Date: Oct. 5, 2016

(87) PCT Pub. No.: WO2016/004976
PCT Pub. Date: Jan. 14, 2016

(65) Prior Publication Data
US 2017/0356785 A1 Dec. 14, 2017

(51) Int. Cl.
*G01F 23/284* (2006.01)
*G01F 25/00* (2006.01)
(Continued)

(52) U.S. Cl.
CPC ........ *G01F 23/284* (2013.01); *G01F 25/0061* (2013.01); *G01S 7/4052* (2013.01); *G01S 13/88* (2013.01); *G01S 2007/4091* (2013.01)

(58) Field of Classification Search
CPC .... G01F 23/284; G01F 25/0061; G01S 13/88; G01S 7/4052; G01S 2007/4091
(Continued)

(56) References Cited

U.S. PATENT DOCUMENTS 8,009,085 B2 * 8/2011 Kuhlow ............... G01F 25/0061
324/600
2010/0207807 A1 * 8/2010 Kuhlow ................ G01F 23/284
342/124

(Continued)

FOREIGN PATENT DOCUMENTS

| EP | 1751506 A1 | 2/2007 |
| GB | 2285131 A | 6/1995 |
| GB | 2418733 A | 4/2006 |

OTHER PUBLICATIONS

International Search Report for related application PCT/EP2014/064491, dated Jan. 4, 2015.

*Primary Examiner* — Frank J McGue
(74) *Attorney, Agent, or Firm* — William Gray Mitchell

(57) ABSTRACT

The invention is a radar level gauge comprising a signal generator for generating electromagnetic waves and an antenna for emitting the electromagnetic waves in a container and for receiving electromagnetic waves reflected by the container. The radar level gauge also comprises a safety arrangement for verifying the functional capability or for improving the measuring quality of the radar level gauge, said safety arrangement having a reflector and an adjustment rod and/or a reduction sheath and being suitably designed to adjust the reflector and/or the reduction sheath at least between a first position and a second position, in which the reflector reflects the electromagnetic waves in a reduced manner. The adjustment rod acts on the reflector and/or the reduction sheath in a contactless manner.

17 Claims, 3 Drawing Sheets

(51) Int. Cl.
*G01S 7/40* (2006.01)
*G01S 13/88* (2006.01)

(58) Field of Classification Search
USPC .......................................................... 342/124
See application file for complete search history.

(56) References Cited

U.S. PATENT DOCUMENTS

2017/0074710 A1* 3/2017 Hengstler ........... G01F 25/0061
2017/0356785 A1* 12/2017 Hengstler ........... G01F 25/0061

* cited by examiner

RADAR LEVEL GAUGE COMPRISING A SAFETY DEVICE

CROSS REFERENCE TO RELATED APPLICATIONS

This patent application claims priority to International Patent Application PCT/EP2014/064491, filed on Jul. 7, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a radar level gauge comprising a safety arrangement.

Background of the Invention

Radar level gauges with such safety arrangements are known from prior art, for example from U.S. Pat. No. 8,009,085 B2, and show a signal generator for generating electromagnetic waves and an antenna for emitting the electromagnetic waves into a container as well as for receiving reflected electromagnetic waves from the container, with the safety arrangement being suitably embodied to check the functionality of the radar level gauge. The safety arrangements shown in prior art comprise for this purpose a reflector and an adjustment rod, which are suitably embodied to adjust the reflector at least between a first position in which it reflects the electromagnetic waves and a second position in which it reflects the electromagnetic waves in a reduced fashion.

The radar level gauges known from prior art are generally used in containers, usually tanks or silos, which are embodied for storing various materials. For example food, drinks, drugs, or fuels are stored in such tanks or silos, so that a touchless fill level measurement is required. In prior art, for example the above-mentioned radar level gauge or alternatively ultrasound-based fill level gauges are known as touchless fill level measuring technologies. Based on their high precision of measurement and their low susceptibility to malfunction here radar level gauges are widely used.

The radar level gauges known from prior art are generally fastened via a flange in the upper area of the tank or silo, with an electronic being arranged outside the housing and an antenna of the radar level gauge being arranged inside thereof. The antenna is aligned in a suitable fashion so that electromagnetic waves, i.e. particularly a radar signal, can be sent in the direction towards the filled in material stored inside the container, and that it can receive electromagnetic waves reflected by said material. Based on a time difference between emitting the electromagnetic signal and receiving the reflected electromagnetic signal here a fill level inside the container can be determined.

For the functional control of a radar level gauge, particularly to test its functionality in a safety-relevant maximum fill level, a fill level at which an automatic protection system prevents any further filling in and perhaps at other relevant fill levels, it is necessary to provide a safety arrangement, which allows a statement regarding the functionality at said maximum fill level. For this purpose, it is known in prior art during a safety test to move a reflector manually into the radiation path of the radar level gauge in order to test here, even in case of lower fill levels of the container, to check the function of the level gauge at a desired fill level by inserting the reflector at this fill level into the radiation path of the radar level gauge and this way to generate a reflection at the desired fill level.

In radar level gauges of prior art it is also considered disadvantageous that the known arrangements, due to their mechanic design, generally cannot be sealed from the environment or only with great difficulty and therefore any application for toxic and/or pressurized substances is impossible or to a very limited extent only.

Therefore the objective of the present invention is to correct the disadvantages known from prior art and to provide a further developed radar level gauge as well as a safety arrangement for it not showing any of these disadvantages.

This objective is attained in a radar level gauge comprising the features of claim 1 as well as a safety arrangement showing the features of claim 16.

BRIEF SUMMARY OF THE INVENTION

In a preferred embodiment, a radar level gauge (1) comprising a signal generator for generating electromagnetic waves and an antenna (3) for emitting the electromagnetic waves as well as receiving reflected electromagnetic waves, comprising a safety arrangement (5) for checking the functionality or for improving the quality of measurements of the radar level gauge (1), with the safety arrangement (5) comprising a reflector (7) and an adjustment rod (9) and/or a reduction sheath (15) and being suitably embodied to adjust the reflector (7) and/or the reduction sheath (15) at least between a first position (I), in which the reflector reflects the electromagnetic waves, and a second position (II), in which the reflector reflects the electromagnetic waves in a reduced fashion, characterized in that the adjustment rod (9) acts in a touchless fashion upon the reflector (7) and/or the reduction sheath (15).

In a preferred embodiment, the radar level gauge (1) as described herein, characterized in that the adjustment rod (9) comprises a magnetic coupling to the reflector (7) and/or the reduction sheath (15).

In a preferred embodiment, the radar level gauge (1) as described herein, characterized in that the adjustment rod (9) rotationally moves the reflector (7) and/or the reduction sheath (15).

In a preferred embodiment, the radar level gauge (1) as described herein, characterized in that the adjustment rod (9) acts linearly upon the reflector (7) and/or the reduction sheath (15).

In a preferred embodiment, the radar level gauge (1) as described herein, characterized in that the adjustment rod (9) comprises a permanent magnet (12).

In a preferred embodiment, the radar level gauge (1) as described herein, characterized in that the adjustment rod (9) is arranged in a housing (10) separated from the measuring environment in a preferably pressure-tight fashion.

In a preferred embodiment, the radar level gauge (1) as described herein, characterized in that the housing (10) is connected to a fastening flange (6), preferably welded thereto.

In a preferred embodiment, the radar level gauge (1) as described herein, characterized in that the adjustment rod (9) is arranged inside the housing (10) and the reflector (7) and/or the reduction unit (15) outside thereof.

In a preferred embodiment, the radar level gauge (1) as described herein, characterized in that the safety arrangement (5) is embodied such that it automatically shifts into the second position (II) without any operational intervention.

In a preferred embodiment, the radar level gauge (1) as described herein, characterized in that the adjustment rod (9) and/or the reflector (7) and/or the reduction sheath (15) comprise a permanent magnet (12).

In a preferred embodiment, the radar level gauge (1) as described herein, characterized in that the reduction sheath (15) is embodied as a sheath that is mobile in reference to the reflector (7).

In a preferred embodiment, the radar level gauge (1) as described herein, characterized in that the sheath of the reflector (7) projects beyond the reflector (7) in the second position (II) preferably in the radial direction.

In a preferred embodiment, the radar level gauge (1) as described herein, characterized in that the reflector (7) is embodied as a stop for the reduction sheath (15).

In a preferred embodiment, the radar level gauge (1) as described herein, characterized in that the reduction sheath (15) is embodied such that in the second position (II) it reflects the electromagnetic waves away from the antenna (3).

In a preferred embodiment, the radar level gauge (1) as described herein, characterized in that the arrangement comprises a sensor for monitoring the position of the reflector (7) and/or the reduction sheath (15).

In a preferred embodiment, the radar level gauge (1) as described herein, characterized in that the adjustment rod is driven automatically.

In a preferred embodiment, the radar level gauge (1) as described herein, characterized in that the adjustment rod is coupled to a field device.

In a preferred embodiment, a safety arrangement (5) for a radar level gauge (1) showing the characterizing features as described herein.

DETAILED DESCRIPTION OF THE INVENTION

Figure 1:
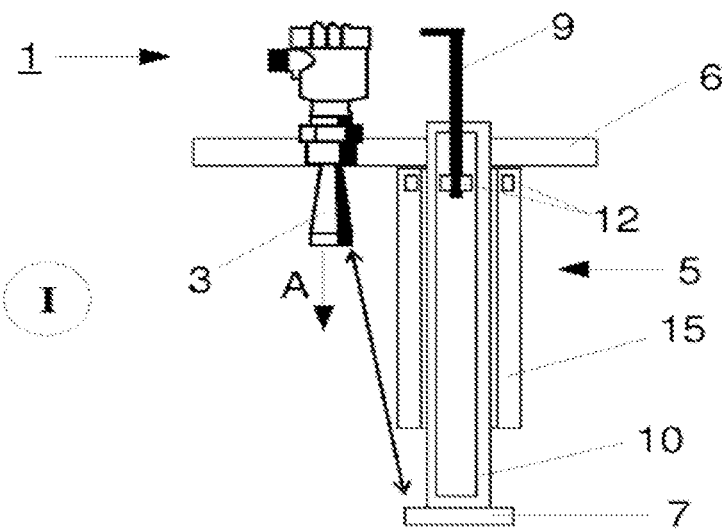
FIG. 1 is a line drawing evidencing the principle of a radar level gauge comprising a safety arrangement in the first position.

A radar fill gauge according to the invention with a signal generator for generating electromagnetic waves and an antenna for emitting the electromagnetic waves in a container as well as for receiving reflected electromagnetic waves from the container with a safety arrangement for testing the functionality and/or for improving the quality of measurements of the radar level gauge comprises a safety arrangement with a reflector and an adjustment rod and/or a reduction sheath, with the safety arrangement being suitably embodied to adjust the reflector and/or the reduction sheath at least between a first position in which the reflector reflects the electromagnetic waves, and a second position in which the reflector reflects the electromagnetic waves in a reduced fashion, and is characterized in that the adjustment rod operates in a touchless fashion upon the reflector and/or the reduction sheath.

Due to the fact that the fastening device acts upon the reflector and/or the reduction sheath in a touchless fashion it is possible that the adjustment rod and the reflector and/or the reduction sheath can be inserted into the container and operated separated from each other and particularly in a sealed fashion. By a seal between the adjustment rod and the reflector and/or the reduction sheath it is also possible that a mechanical passage, coupling a motion of the adjustment rod from outside the tank into the tank and this way acting upon the reflector and/or the reduction sheath, is avoided such that overall a reliable sealing is possible of the container/tank in reference to the environment.

A touchless action of the adjustment rod upon the reflector and/or the reduction sheath can be achieved for example by a magnetic coupling between the adjustment rod and the reflector and/or the reduction sheath. By such a magnetic coupling a motion of the adjustment rod can be transferred easily and relatively reliably to the reflector and/or the reduction unit.

In a first embodiment the adjustment rod transfers the rotary motion upon the reflector and/or the reduction sheath such that particularly the magnetic coupling forces can be kept low.

In an alternative embodiment the adjustment rod transfer a linear motion upon the reflector and/or the reduction sheath. By transferring a linear motion, for example a gravity-induced resetting of the safety arrangement can be achieved into the second position, in which the safety arrangement reduces the emitted electromagnetic waves or abstains from reflecting them. This way, the functionality of the radar level gauge is also ensured in case of a malfunction of a safety arrangement.

Ideally, the adjustment rod is arranged in a housing, preferably pressure tight and separated from a measuring environment. This housing may be connected to a fastening flange, for example, with a seal being provided between the housing and the flange, for example via a welding seam or other sealing means.

This way, a pressure-tight and diffusion-tight separation of the adjustment rod from the measuring environment is achieved very reliably, particularly allowing a use in pressurized and/or toxic media.

Preferably the adjustment rod is arranged inside the housing and the reflector and/or the reduction sheath outside thereof. The housing can be embodied for example as a cylinder closed at the end and projecting into the container, which is connected to the fastening flange. Such an arrangement can provide simultaneously a defined alignment of the safety arrangement towards the antenna of the radar level gauge so that no additional calibration and alignment is required.

Preferably the reflector is arranged with its end at the housing such that a simple interaction between the adjustment rod and the reflector and/or the reduction sheath can be yielded.

The safety arrangement can for example be embodied such that it automatically transfers into a second position, without any operative intervention, and thus also in case of a defect, for example of the adjustment rod, ensuring the operation of the radar level gauge.

A particularly beneficial magnetic coupling can be achieved when the adjustment rod and/or the reflector and/or the reduction sheath show at least one permanent magnet. By suitably embodied permanent magnets a good magnetic coupling can be yielded, which depending on the alignment of the poles of the magnet in reference to each other by the attracting and/or repelling effect allows a reliable switching from the first position into the second position and vice versa.

The reduction sheath can be embodied for example as a sheath, mobile in reference to the reflector, which is pulled vertically upwards by the adjustment rod, for example, and this way exposes the reflector. The reflector can for example be arranged perpendicular in reference to a primary direction of emission of the antenna and in the second position exceeded by the sheath, preferably in the radial direction. This way the reflector can also be embodied as a stop for the reduction sheath so that a particularly simple mechanic arrangement is yielded.

The reduction sheath can here be embodied for example such that in the second position it reflects the electromagnetic waves away from the antenna so that in reference to the first position here a reduction of the reflected electromagnetic waves develops.

In a further development of the invention the arrangement may show a sensor for monitoring the position of the reflector and/or the reduction sheath and/or the adjustment rod such that an electronic monitoring of the position of the reflector and/or the reduction sheath is possible as well. This way, in spite of a spatial separation of the adjustment rod from the reflector and/or the reduction sheath, it is made possible to monitor the actual conditions inside the container such that information is provided as to whether the adjustment rod is acting reliably upon the reflector and/or the reduction sheath.

In addition to a radar level gauge with a safety arrangement, the possibility for retrofitting the safety arrangement may be provided as well. Accordingly, the present invention also refers to a safety arrangement for radar level gauges showing the above-described features.

DETAILED DESCRIPTION OF THE FIGURES

FIG. 1 shows a schematic illustration of a radar level gauge 1 with a safety arrangement 5, with the safety arrangement 5 being shown in a first position I, in which a reflector 7 of the safety arrangement 5 shows electromagnetic waves emitted by an antenna 3 of the radar level gauge 1 in a reflected fashion. The radar level gauge 1 is designed in the present exemplary embodiment with an antenna 3, which in the present case is embodied as a horn antenna. However, other forms of antennas are possible here, too, without leaving the scope of the present invention.

In the present exemplary embodiment the safety arrangement 5 is designed as a cylindrically formed housing 10, with at the end near the container of reflector 7 being arranged in an alignment perpendicular to a primary direction of emission A of the antenna 3. The housing 10 is arranged parallel in reference to the radar level gauge 1 in a fastening flange 6 and this way already aligned by the factory and matches the fill level gauge 1. The safety arrangement 5 further comprises a reduction sheath 15, which is embodied as a sheath displaceable axially at the housing. At one end of the reduction sheath 15 near the flange the device comprises two permanent magnets 12, which cooperate with two other permanent magnets 12 arranged at an adjustment rod 9 provided in the housing 10. In order to yield higher protection from malfunction of the arrangement, here additional magnets may be arranged distributed over the entire length.

By a magnetic coupling between the permanent magnet 12 at the reduction unit 15 and the adjustment rod 9 it is possible to lift the reduction sheath 15, embodied as a sheath, opposite the forces of gravity from the reflector 7, arranged with its end at the housing 10, which reflector in the present case also serves as a stop, and expose it as shown in FIG. 1 for reflecting electromagnetic waves emitted by the antenna 3. The housing 10 can in this embodiment be connected circumferentially with the fastening flange 6, for example welded, so that an arrangement develops which is pressure and diffusion tight. This way a radar level gauge 1 with a safety arrangement 5 shown in FIG. 1 can also be used for toxic and/or pressurized media.

In order to allow a magnetic coupling through the housing 10 it is necessary that it is at least sectionally made from a non-magnetic material, for example stainless steel.

An activation of the adjustment rod 9, not shown in greater detail in the present case, can occur manually, pneumatically, or electrically. In particular a manual and pneumatic operation of the adjustment rod 9 is preferred because this way a low susceptibility to the adjustment malfunctioning can be achieved in a particularly simple fashion.

Figure 2:
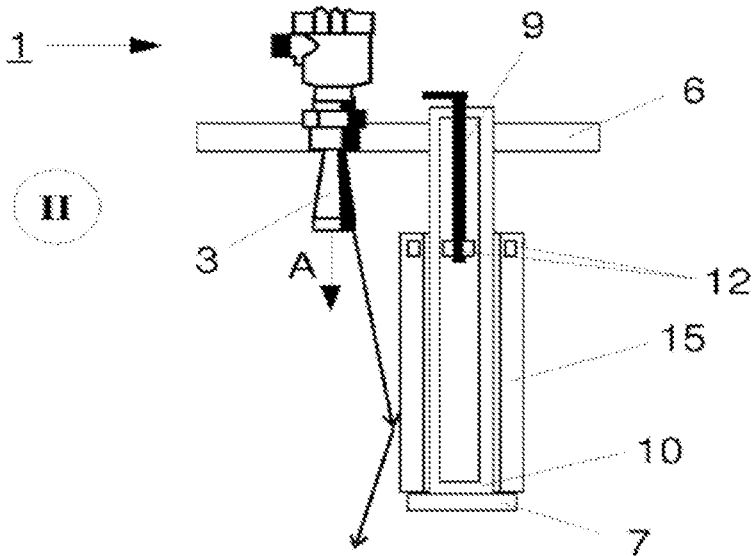
FIG. 2 is a line drawing evidencing the radar level gauge of FIG. 1 with a safety arrangement in the second position.

FIG. 2 shows the radar level gauge 1 of FIG. 1 with the safety arrangement 5 in a second position II, in which the reduction sheath 15 reflects the electromagnetic waves emitted by the antenna 3 to an area oriented parallel in reference to the primary direction of emission A of the antenna 3 and thus guides them in the direction of the filled in goods. When compared to the first position I shown in FIG. 1, here a considerable reduction of the reflection is yielded, causing the safety arrangement 5 to be essentially deactivated. In the position shown in FIG. 2 it is also clearly discernible that the reflector 7 in the present embodiment serves as a stop for the reduction sheath 15.

If in the exemplary embodiment shown in FIGS. 1 and 2 the magnetic coupling between the operating device 9 and the reduction sheath 15 was to operate in an unreliable fashion for whatever reason, additionally the effects of gravity ensure that the reduction sheath 15 is automatically switched into the second position II and thus a regular operation of the radar level gauge 1 is ensured.

Figure 3:
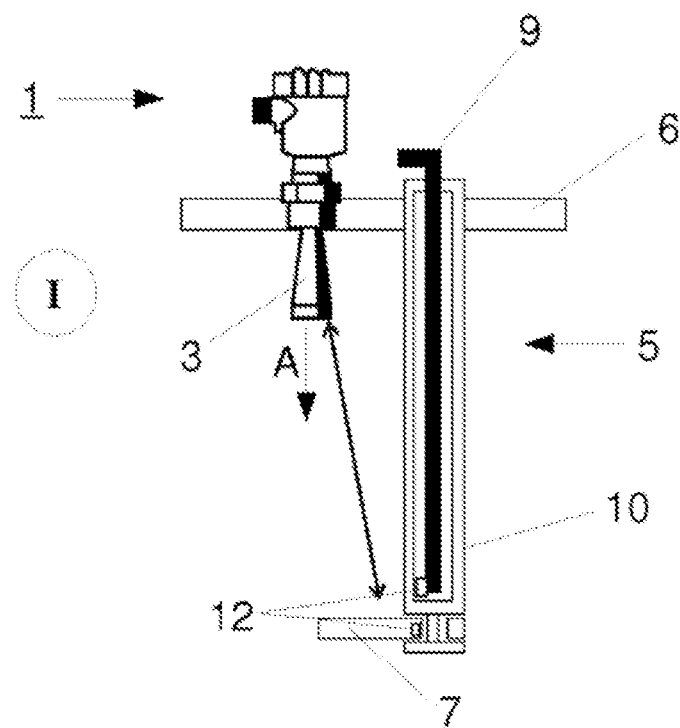
FIG. 3 is a line drawing evidencing shows another exemplary embodiment of a radar level gauge with a safety arrangement showing a rotary reflector in the first position.
Figure 4:
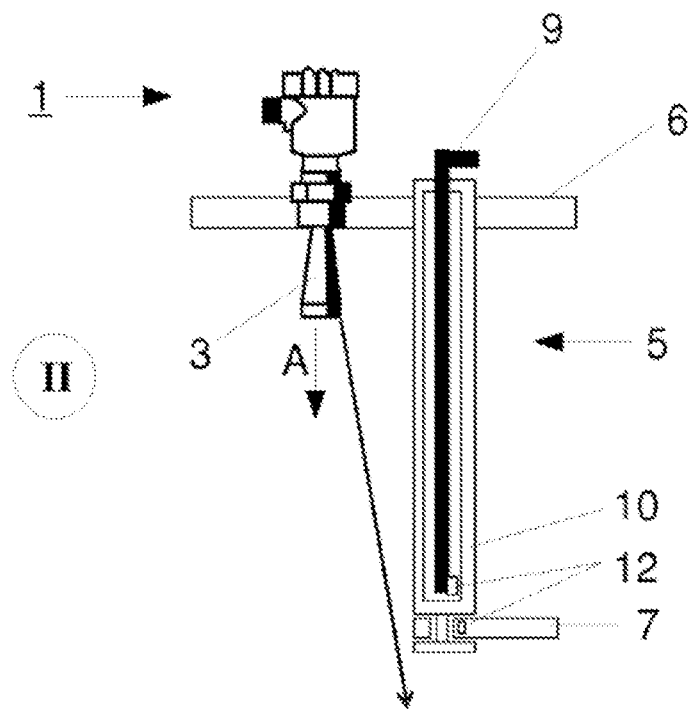
FIG. 4 is a line drawing evidencing the radar level gauge of FIG. 3 in a second position.

FIG. 3 shows an exemplary embodiment of a radar level gauge 1 with a safety arrangement 5, with the safety arrangement 5 being in a first position I. The switch from the first position I to the second position II, shown in FIG. 4, occurs in this exemplary embodiment as well via a magnetic coupling, which is realized by two permanent magnets 12, with in this exemplary embodiment the reflector 7 being embodied in a rotary fashion. If in the present exemplary embodiment the adjustment rod 9 is rotated in its longitudinal axis, via the permanent magnets 12, which are arranged at one side at the adjustment rod 9 and at the other side at a reflector 7, this rotary motion is transferred to the reflector 7 such that it can be moved out of the first position I into the second position II. As further discernible from FIGS. 3 and 4 the reflector 7 is arranged in the first position I such that it reflects electromagnetic radiation emitted by the antenna 3. In the second position II the reflector 7 is removed from the radiation path of the antenna 3 such that no reflection occurs. Similar to the exemplary embodiment shown in FIGS. 1 and 2, it must be emphasized that the housing 10 is connected to the flange 6 in a pressure and diffusion tight fashion and this way the safety arrangement can be applied in an advantageous fashion.

Figure 5:
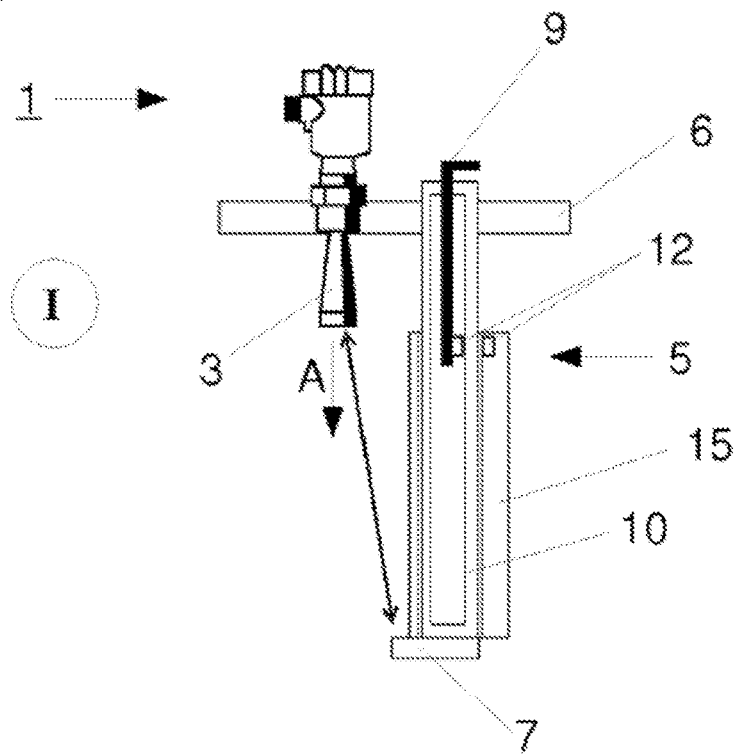
FIG. 5 is a line drawing evidencing a radar level gauge with a rotationally embodied reduction sheath in the first position.
Figure 6:
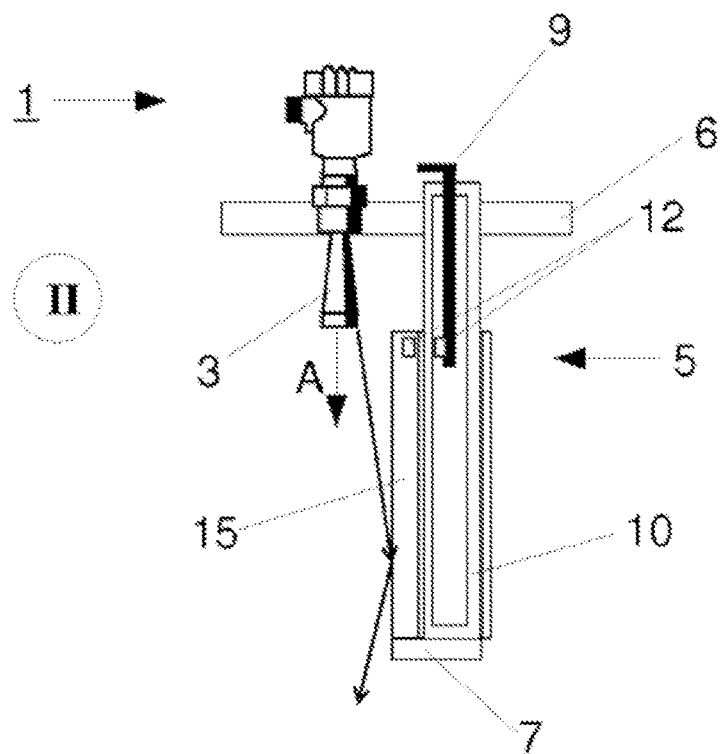
FIG. 6 is a line drawing evidencing the radar level gauge of FIG. 5 in the second position.

FIGS. 5 and 6 show another exemplary embodiment of a radar level gauge 1 and in this exemplary embodiment the reduction sheath 15, as also used in the first exemplary embodiment of FIGS. 1 and 2, is designed asymmetrically and in a rotary fashion. In the first position shown in FIG. 5 the reduction sheath 15 is arranged such that a portion of the reflector 7 is exposed and this way a reflection of electromagnetic radiation emitted by the antenna 3 can occur. In the second position II, which is shown in FIG. 6, the reduction sheath 15 is arranged rotated by 180° about its longitudinal axis and completely covers by its asymmetric design the reflector 7 when seen from the antenna 3 such that any electromagnetic radiation emitted by the antenna 3 is further reduced at the reduction sheath 15, or as shown in FIG. 6, further reflected towards the filled in goods. In any case it is decisive that a signal returned by the reflector 7 in the direction of the antenna 3 is reduced in reference to the first position 1.

Similar to the previous exemplary embodiment, a coupling between the adjustment rod 9 and the safety arrangement 5 occurs, in this case of the reduction sheath 15, via two permanent magnets 12 arranged at the one side at the adjustment rod 9 and at the other side at the reduction sheath 15. They transfer a rotary motion of the adjustment rod 9 to the reduction sheath 15.

LIST OF REFERENCE NUMBERS 1 radar level gauge
3 antenna
4 container
5 safety arrangement
6 fastening flange
7 reflector
9 adjustment rod
10 housing
12 permanent magnets
15 reduction sheath
A direction of emission
I first position
II second position The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A radar level gauge comprising a signal generator for generating electromagnetic waves and an antenna for emitting the electromagnetic waves as well as receiving reflected electromagnetic waves, comprising a safety arrangement for checking the functionality or for improving the quality of measurements of the radar level gauge, with the safety arrangement comprising a reflector and an adjustment rod and a reduction sheath and being suitably embodied to adjust the reflector and the reduction sheath at least between a first position, in which the reflector reflects the electromagnetic waves, and a second position, in which the reflector reflects the electromagnetic waves in a reduced fashion, wherein the adjustment rod comprises a magnetic coupling to the reflector and the reduction sheath allowing the adjustment rod to touchlessly adjust the reflector and the reduction sheath.

2. The radar level gauge according to claim 1, wherein the adjustment rod rotationally moves the reflector and the reduction sheath.

3. The radar level gauge according to claim 1, wherein the adjustment rod acts linearly upon the reflector and the reduction sheath.

4. The radar level gauge according to claim 1, wherein the adjustment rod comprises a permanent magnet.

5. The radar level gauge according to claim 1, wherein the adjustment rod is arranged in a housing separated from the measuring environment in a preferably pressure-tight fashion.

6. The radar level gauge according to claim 5, wherein the housing is welded to a fastening flange.

7. The radar level gauge according to claims 5, wherein the adjustment rod is arranged inside the housing and the reflector or the reduction sheath outside thereof.

8. The radar level gauge according to claim 1, wherein the safety arrangement is embodied such that it automatically shifts into the second position without any operational intervention.

9. The radar level gauge according to claim 1, wherein one or more of the adjustment device, the reflector and the reduction sheath comprises a permanent magnet.

10. The radar level gauge according to claim 1, wherein the reduction sheath is embodied as a sheath that is mobile in reference to the reflector.

11. The radar level gauge according to claim 10, wherein the sheath of the reflector projects beyond the reflector in the second position and in the radial direction.

12. The radar level gauge according to claim 11, wherein the reflector is embodied as a stop for the reduction sheath.

13. The radar level gauge according to claim 12, wherein the reduction sheath is embodied such that in the second position it reflects the electromagnetic waves away from the antenna.

14. The radar level gauge according to claim 1, wherein the arrangement comprises a sensor for monitoring the position of the reflector and the reduction sheath.

15. The radar level gauge according to claim 1, wherein the adjustment rod is driven automatically.

16. The radar level gauge according to claim 1, wherein the adjustment rod is coupled to a field device.

17. A safety arrangement for the radar level gauge of claim 1, comprising a reflector and an adjustment rod and a reduction sheath and being suitably embodied to adjust the reflector and the reduction sheath at least between a first position, in which the reflector reflects the electromagnetic waves, and a second position, in which the reflector reflects the electromagnetic waves in a reduced fashion, wherein the adjustment rod acts in a touchless fashion upon the reflector and the reduction sheath.

\* \* \* \* \*